Figure 4:
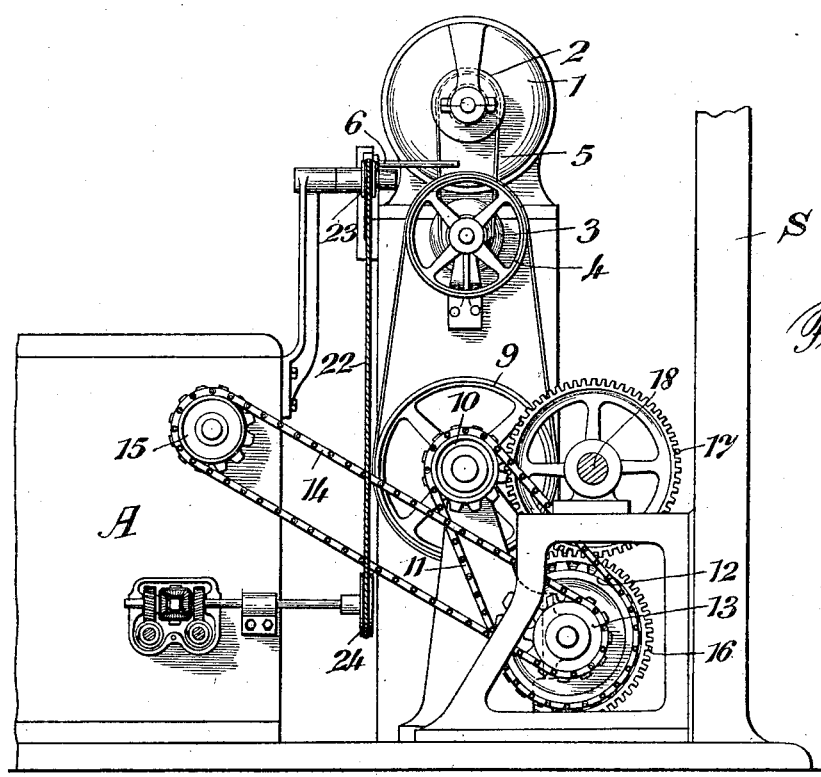

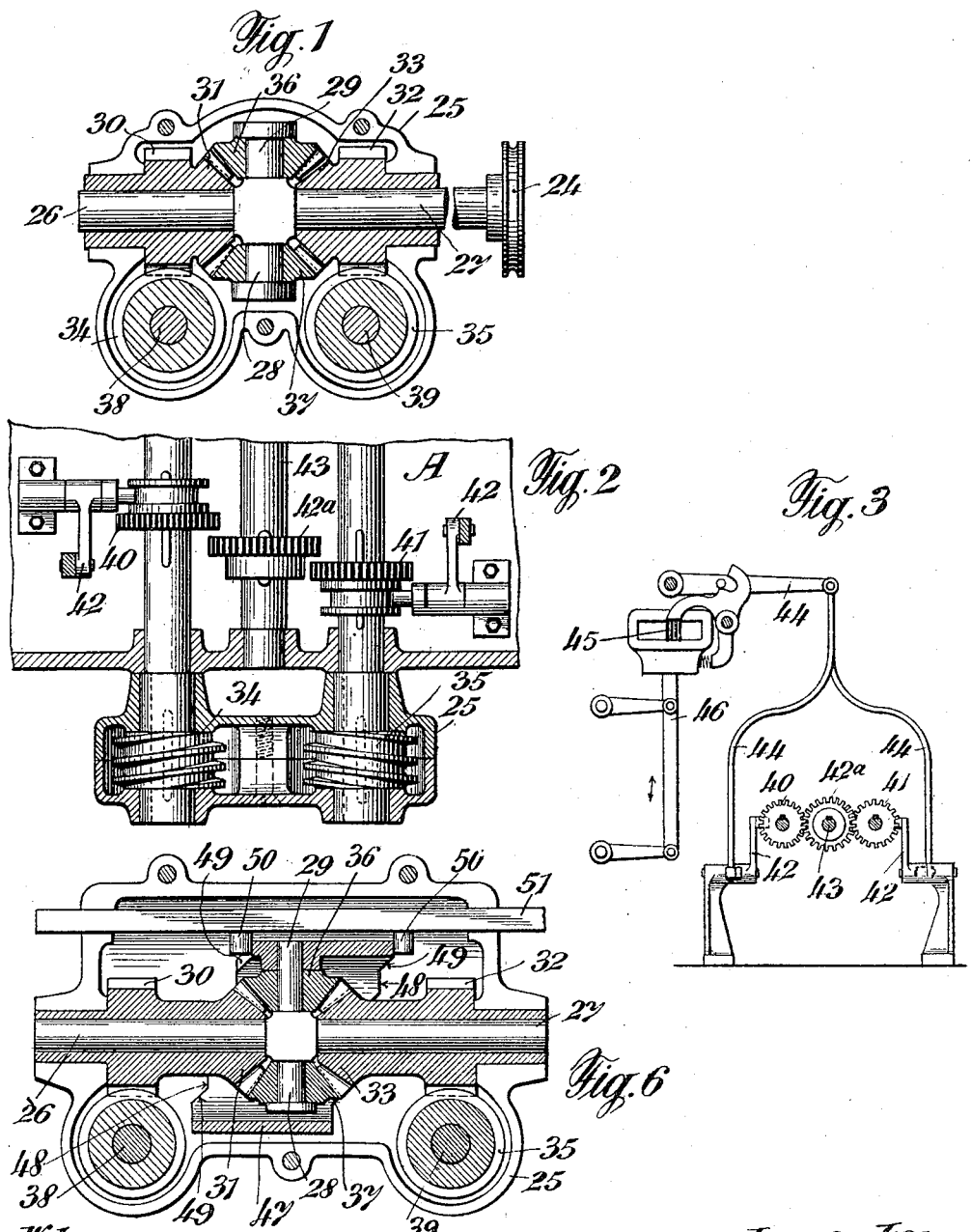
K. EGGART.
GEARING.
APPLICATION FILED MAR. 14, 1913.
1,210,775. Patented Jan. 2, 1917.
3 SHEETS—SHEET 1.

K. EGGART.
GEARING.
APPLICATION FILED MAR. 14, 1913.

1,210,775.

Patented Jan. 2, 1917.
3 SHEETS—SHEET 2.

Witnesses:
E. M. Taylor
Worthington Campbell

Inventor:
Karl Eggart
BY William B. Greeley
and William A. Redding
Att'ys

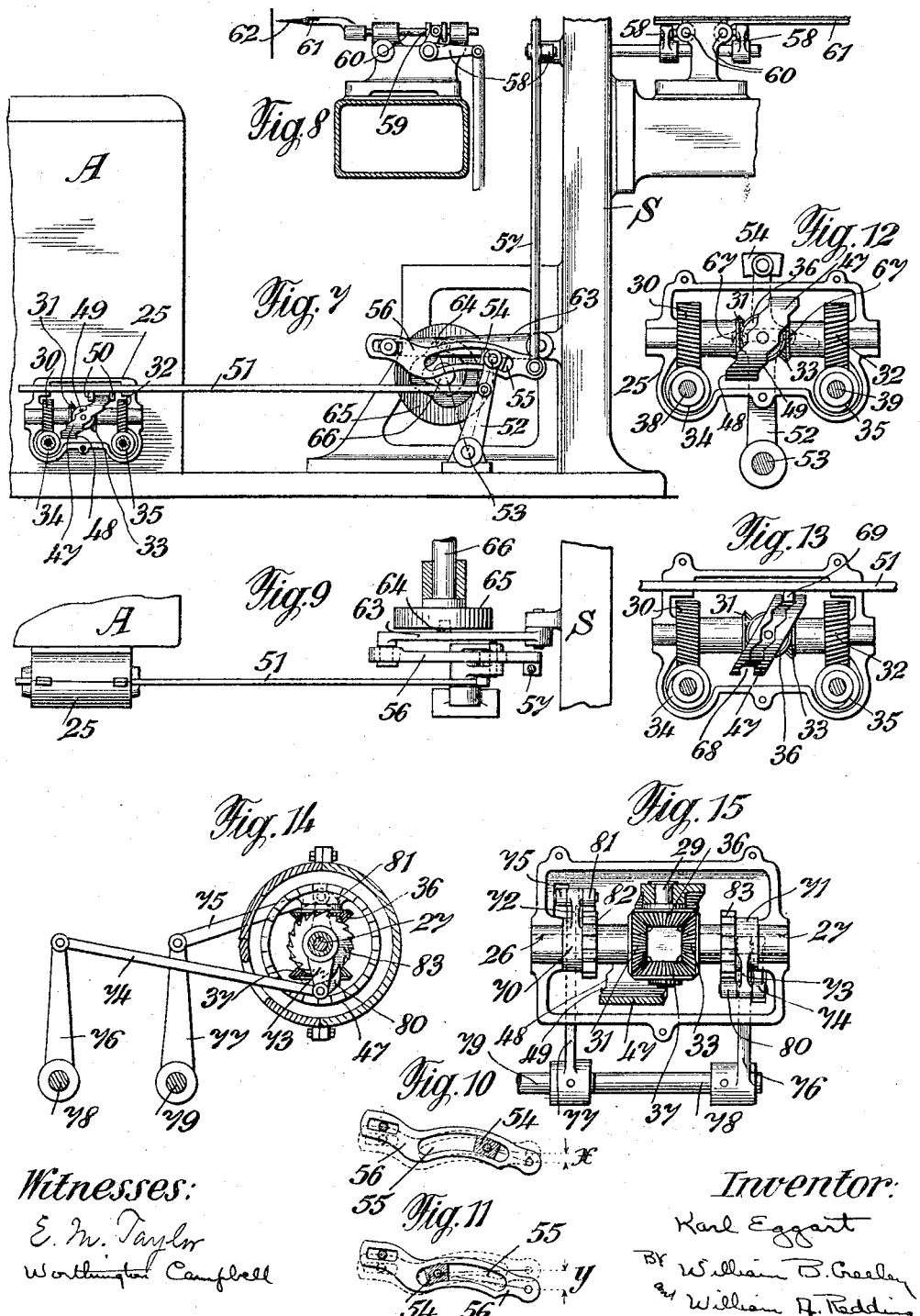

UNITED STATES PATENT OFFICE.

KARL EGGART, OF ARBON, SWITZERLAND, ASSIGNOR TO THE FIRM OF ADOLPH SAURER, OF ARBON, SWITZERLAND.

GEARING.

1,210,775.  Specification of Letters Patent.  Patented Jan. 2, 1917.

Application filed March 14, 1913. Serial No. 754,194.

*To all whom it may concern:*

Be it known that I, KARL EGGART, a subject of the Emperor of Germany, residing at Arbon, Switzerland, have invented new and useful Improvements in Gearing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object particularly in view in this invention is the production of an improved gearing for effecting, under the control of a jacquard mechanism, a step by step movement, in one direction or the other, of one part or another of the embroidery machine, such as the mechanism for changing the length of stroke of the perforators, punches, thread guides, thread rollers, etc., and the mechanism for altering the speed ratio between the gearing for driving the embroidery machine and the automatic or jacquard mechanism. The improved gearing comprises the essential parts of an ordinary differential gearing but it has combined therewith other parts which change the mode of operation of an ordinary differential gearing so that the power, instead of being applied to the central part of the differential gearing and acting through one or the other or both of what may be called the terminal or lateral parts or members of the differential gearing, for the purpose of effecting differential movement of the parts actuated by such terminal or lateral parts or members, is applied, through separate driving devices, to the terminal or lateral parts or members of the differential gearing and produces a predetermined movement of the central part of the differential gearing in one direction or the other, the part to be driven or actuated being operatively connected to such central part or member. In the special application of the invention which is contemplated one or the other of the terminal or lateral parts or members of the differential gearing receives a predetermined movement, either through a single unit of extent or through a multiple of that unit so that the driven part, operatively connected with the central part or member of the differential gearing, is driven in one direction or the other, according to whether one or the other of the terminal or lateral parts or members is actuated, to an extent which depends upon the extent to which such terminal or lateral part or member of the differential gearing is actuated, but it will be understood that the movement produced might be continuous within its limits rather than step by step. It will also be understood that the improved gearing, although designed for the special purposes herein mentioned, is capable of a wider application.

The invention is illustrated in the accompanying drawings in which are shown such parts of a jacquard embroidery machine as are necessary for an understanding of the invention.

Figure 5:
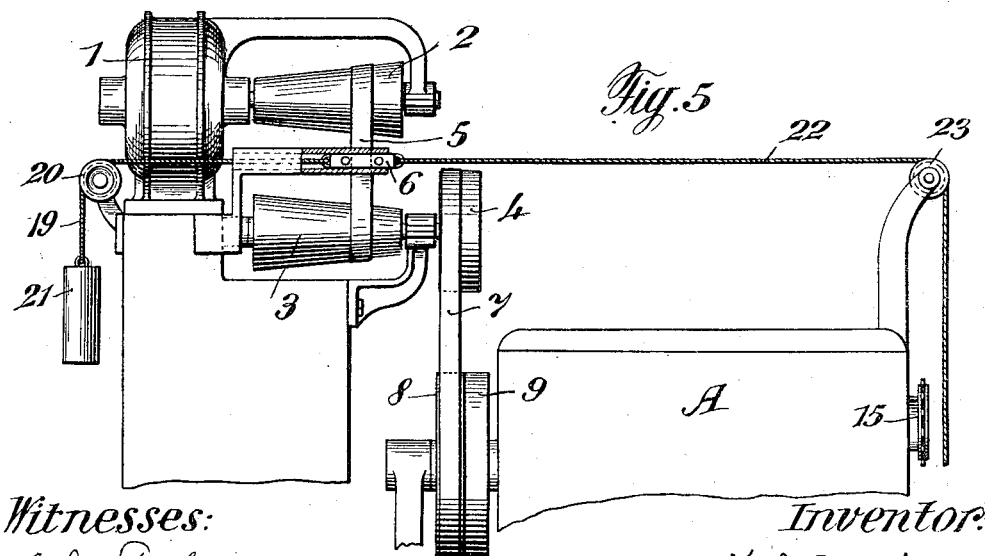

In the drawings—Figure 1 is a view in vertical section of the improved gearing with its immediate connections. Fig. 2 is a sectional plan view of the parts shown in Fig. 1. Fig. 3 is a view in sectional elevation, on a smaller scale, showing the usual jacquard controlled devices for throwing the worm shafts into and out of gear. Fig. 4 is a view in end elevation illustrating the application of the invention to a jacquard embroidery machine for the purpose of changing speed. Fig. 5 is a view partly in side elevation and partly in section of the upper portion of the mechanism shown in Fig. 4. Fig. 6 is a view in vertical section of a different embodiment of the invention. Fig. 7 is a view in elevation illustrating the application of the invention for adjusting the perforator mechanism of an embroidery machine. Fig. 8 is a cross sectional view showing the perforator mechanism as viewed at right angles to Fig. 7. Fig. 9 is a plan view of the parts shown in Fig. 7, the perforator mechanism being omitted. Figs. 10 and 11 show the adjustably fulcrumed lever, to be hereinafter referred to, with its fulcrum in two different positions. Fig. 12 shows a modification in which the stepped cam ring of the gear engages direct with the lever which shifts the adjustable fulcrum. Fig. 13 is a like view of a modification in which a cam ring with stepped grooves is employed. Fig. 14 is a cross sectional view of a modification in which ratchet mechanism is used. Fig. 15 is a view partly in elevation and partly in section of the parts shown in Fig. 14.

Referring in particular to the construction shown in Figs. 1–5, 1 designates the motor, on whose shaft there is mounted a cone pulley 2, connected by a belt 5 with a second cone pulley 3, mounted on the same shaft as a belt pulley 4 (Figs. 4 and 5). 6 is a fork for shifting the belt 5. 8 and 9 are respectively loose and fast pulleys, connected by a belt 7 with the pulley 4. By means of the fast pulley 9 there is driven a sprocket wheel 10, whose chain 11 drives a second sprocket wheel 12, whereby motion is imparted to another sprocket wheel 13, which is connected by a chain 14 with a sprocket wheel 15 that drives the jacquard mechanism A. On the shaft of the sprocket wheel 12 there is also mounted a spur wheel 16, which meshes with a spur wheel 17, whereby motion is imparted to the shaft 18, which actuates the needles, shuttles, etc., of the embroidery machine, of which only a portion of a standard S is shown in the drawing.

By means of the present invention the belt 5 can be shifted stepwise when required, whereby both the jacquard mechanism A and the embroidery machine S can be driven by the motor 1 at a definitely increased or decreased speed, as desired. For this purpose there is connected to the fork 6 at one side a rope 19, which runs over a grooved pulley 20 and has a weight 21 attached to its other end; while at the other side of the fork 6 there is fastened a rope 22, which runs over a grooved pulley 23 and is secured to the periphery of another grooved pulley 24, which is connected with differential gear of peculiar construction, as shown in Figs. 1 and 2. The casing of this gear is designated 25, and has mounted within it a shaft 26, 27, with studs 28, 29 at right angles thereto. On the shaft arm 26 there is loosely mounted a worm wheel 30, which is integral with a differential gear wheel 31. On the shaft arm 27, to which the grooved pulley 24 is rigidly secured, there is loosely mounted a worm wheel 32, which is integral with the differential gear wheel 33. With the worm wheels 30, 32, there engage worms 34, 35, mounted on shafts 38, 39, and having threads which run in opposite directions (Fig. 2), the worm wheels 30, 32, being formed correspondingly. With the differential gear wheels 31, 33, there mesh differential gear wheels 36, 37, loosely mounted on the studs 28, 29. For convenience in description the studs 28, 29 with their beveled gears 36, 37, or the equivalents thereof, may be referred to as the central member of the differential gear and the beveled gears 31, 33 as the terminal or lateral members of the differential gearing. The shafts 38, 39 extends into the jacquard mechanism A (Fig. 2), and on them are splined the spur gears 40, 41, which can be shifted independently by levers 42 (Fig. 3), and thus caused to mesh with a spur gear 42$^a$, which is keyed to a shaft 43, and is in constant rotation. The levers 42 are actuated in a well known manner, as by means of rods 44, corresponding to the position of the needles 45, which rest in the vertically reciprocal rod 46, with capability of sliding in longitudinal direction, in the manner disclosed in United States Patent No. 1,055,893, dated March 11, 1913.

Thus depending upon the perforation of the jacquard card, the automatic mechanism A will cause the worm 34 or worm 35 to turn through a certain distance, i. e. stepwise. If, for instance, the worm 34 is turned through one step, the worm wheel 30 will be turned through one step too, and therefore also the differential wheel 31 and the differential wheels 36, 37, which will roll upon the differential wheel 33, but without rotating the latter. In consequence of its arrest by the worm 35, the worm wheel 32 will remain stationary. Hence the shaft 26, 27, and thus the grooved pulley 24, will be turned in one direction through one step, whereby the belt fork 6 will be shifted through one step in one direction, so that there will be a change in the speed ratio between the shaft of the motor 1 on the one hand and the shaft 18 of the embroidery machine S and the sprocket wheel 15 of the automatic mechanism A on the other hand. If, again, the worm 35 is turned through one step, the worm wheel 32 will be turned too, and thus also the differential wheel 33, which, again, turns the differential wheels 36, 37, which wheels now roll upon the differential wheel 31, without rotating it, so that this time the worm wheel 30, in consequence of its arrest by the worm 34, will remain stationary, and the shaft 26, 27 will be turned in the opposite direction, wherefore the belt fork 6 will be pushed to the other side. The rotation of the shaft 26, 27 could also be employed for controlling other moving parts of the jacquard embroidery machine, such for instance as the tools.

Referring now to the modification illustrated in Figs. 6–11, the differential gearing is here employed to change the length of the stroke of the perforators stepwise. The stud 29 is here rigidly connected with a cam ring 47, which is formed with pairs of parallel steps 48, located at right angles to the axis of the shaft 26, 27, and connected by inclines 49. The cam ring 47 (Figs. 6 and 7) lies between and is engaged by two pins 50, projecting from a rod 51, which lies parallel with the shaft 26, 27. This rod 51 is pivoted at one end to a lever 52, whose lower end is fulcrumed on a pin 53, while its top end has pivotally joined to it a block 54 (Figs. 7, 10, 11), which slidably engages in the slot 55 of a lever 56, so as to constitute the fulcrum for the latter. To one end of the lever 56 there is pivoted a rod 57

(Figs. 7 and 8), to which there is connected operatively a bent lever 58, engaging with sleeves 59, rigidly secured to rods 60, which support the bar 61, with the perforators 62. At the other end of this lever 56 there is pivoted one end of a lever 63, whose opposite end is pivoted on the frame of the embroidery machine S. This lever 63 has a laterally projecting pin 64, which engages in a groove in a disk 65, driven by the shaft 66. It is obvious that on rotation of the shaft 66, the perforators 62 are moved to and fro in axial direction, the block 54 serving as stationary fulcrum of the lever 56. If, then, through the jacquard card and automatic mechanism A, one of the worms 34, 35 is turned, the stepped wheel 47 will also be turned in one direction or the other, and the rod 51 will be accordingly pushed through the distance of one or more steps to the right or left. This will cause the block 54 to slide to the right or left, whereby the stroke of the rod 57 will be altered as shown in Figs. 10 and 11, where $x$ and $y$ indicate different lengths of stroke. In this manner the stroke of the perforators 62 can be altered stepwise.

In the modification illustrated in Fig. 12, the two pins 67 which engage the stepped cam ring 47 are provided on the lever 52 itself, so that on rotation of the wheel 47 by one of the worms 34 or 35, the lever 52 and thus the block 54, will be moved direct, to the right or left, through the distance of one or more steps.

In the modification illustrated in Fig. 13, the cam ring 47 is provided with a stepped groove 68, to receive a pin 69, projecting from the rod 51. In this case also, by rotation of the worms 34, 35, a stepwise motion is imparted to the rod 51.

In place of the worm gearing 30, 34, and 32, 35, pawl and ratchet mechanism might be employed, as shown in Figs. 14 and 15. In this construction there are loosely mounted on the shaft 26, 27, sleeves 70, 71, integral with lever arms 72, 73, which are connected by rods 74, 75 with levers 76, 77, secured to shafts 78, 79. These shafts 78, 79 are from time to time actuated stepwise by the automatic mechanism A, in the same manner as the worms 34, 35. The arms 72, 73 are provided with pivotal pawls 80, 81, which are positioned 180° apart. In rigid connection with the differential wheels 31, 33, are ratchet wheels 82, 83 with which the pawls 80, 81 engage. It is manifest, that on oscillation of the shaft 78, or 79, the stepped wheel 47 will be turned one or more steps in one direction or the other.

I claim:

1. A gearing for jacquard embroidery machines comprising a differential gearing with a central member and lateral members, separate means to actuate the lateral members of the differential gearing separately and independently of each other in opposite directions and to hold them from backward movement, a common driving device for said separate means adapted to be placed in operative relation with either of said means, and means to transmit the motion from the central member of the differential gearing.

2. A gearing for jacquard embroidery machines comprising a differential gearing with a central member and lateral members, separate means to actuate the lateral members of the differential gearing separately and independently of each other in opposite directions and to hold them from backward movement, a common driving device for said separate means adapted to be placed in operative relation with either of said means, a pattern mechanism for controlling the operative relation between said driving device and said separate means, and means to transmit the motion from the central member of the differential gearing.

3. A gearing for jacquard embroidery machines and the like comprising a differential gearing with a central member and lateral members, a driving gear secured to each of the lateral members of the differential gearing, a separate actuating means for each of said driving gears, said actuating means acting to actuate the driving gears in opposite directions and to prevent movement of the driving gears in a backward direction, a common driving device for said actuating means, mechanism to place either of said actuating means in operative relation with said driving device, and means to transmit motion from the central member of the differential gearing.

4. A gearing for jacquard embroidery machines and the like comprising a driven shaft, studs thereon at right angles thereof, gears mounted on said studs, other gears mounted loosely on the shaft in engagement with the gears on the studs, a worm gear secured to each of said last named gears, a worm in engagement with each of said worm gears, a common driving device for said worms, and means for placing either of said worms in operative relation with said driving device.

5. A gearing for jacquard embroidery machines and the like comprising a driven shaft, studs thereon at right angles thereof, gears mounted on said studs, other gears mounted loosely on the shaft in engagement with the gears on the studs, a worm gear secured to each of said last named gears, a worm in engagement with each of said worm gears, a common driving device for said worms, means for placing either of said worms in operative relation with said driving device, and a pattern mechanism for controlling the operative relation between said driving device and said worms.

6. A gearing for jacquard embroidery machines and the like comprising a shaft with studs at right angles to the axis thereof, beveled gears loosely mounted on the shaft, beveled gears loosely mounted on the studs and in engagement with said first mentioned gears, separate means for transmitting motion to either of said first mentioned gears and for holding the other from backward rotation, a common driving device for both of said separate means, pattern mechanism for controlling the operative relation between said driving device and said separate means, and means for transmitting rotary motion from the shaft.

7. A gearing for jacquard embroidery machines and the like comprising a shaft with studs at right angles to the axis thereof, beveled gears mounted loosely on the shaft, worm wheels secured to said gears, worms meshing with said worm wheels respectively, a common driving device for both of said worms, means for placing either of said worms in operative relation with said driving device, beveled gears mounted loosely on the studs and in engagement with the first mentioned beveled gears, and means for transmitting motion from the shaft.

8. A gearing for jacquard embroidery machines and the like comprising a shaft with studs at right angles to the axis thereof, beveled gears mounted loosely on the shaft, worm wheels secured to said gears, worms meshing with said worm wheels respectively, a common driving device for both of said worms, means for placing either of said worms in operative relation with said driving device, beveled gears mounted loosely on the studs and in engagement with the first mentioned beveled gears, a pattern mechanism for controlling said last named means, and means for transmitting motion from the shaft.

In testimony that I claim the foregoing as my invention, I have signed my name in presence of two subscribing witnesses.

KARL EGGART.

Witnesses:
LOUIS RICCARDO,
RANDALL ATKINSON.

Copies of this patent may be obtained for five cents each, by addressing the "Commissioner of Patents. Washington, D. C."